United States Patent [19]

Houston

[11] Patent Number: 4,623,184

[45] Date of Patent: Nov. 18, 1986

[54] CONTAINER CARRYING MEANS

[76] Inventor: Roy A. Houston, Rte. 1, Box 248, Kenansville, N.C. 28349

[21] Appl. No.: 737,099

[22] Filed: May 23, 1985

[51] Int. Cl.⁴ .......................... B66C 1/92; B66C 1/28
[52] U.S. Cl. ............................... 294/87.1; 294/87.24; 294/100
[58] Field of Search ................... 294/87.1, 87.2, 87.22, 294/87.24, 87.26, 87.28, 100, 106, 118, 119

[56] References Cited

U.S. PATENT DOCUMENTS 1,184,372  5/1916  Nalley ................................. 294/100
2,181,355 11/1939  Yarwood .......................... 294/87.1
2,325,786  8/1943  McDermott ....................... 294/100
2,349,531  5/1944  Weir .................................. 294/87.24

Primary Examiner—James B. Marbert
Attorney, Agent, or Firm—Mills and Coats

[57] ABSTRACT

This invention is an improved container carrying means in the form of a central housing containing a plurality of inner-connected linkages with gripping fingers outwardly extending from on one end and a handle means outwardly extending from the other end. When the gripping fingers are placed on opposite sides of the containers to be carried and the handle lifted upwardly, the heavier the container, the tighter the gripping finger will hold the same.

9 Claims, 3 Drawing Figures

CONTAINER CARRYING MEANS

FIELD OF INVENTION

This invention relates to transfer means and more particularly to means for picking up and carrying containers.

BACKGROUND OF INVENTION

Since containers first began to be used to store and move products of various kinds, picking up the same has been a problem. The adding of permanent handles or bales has of course been accomplished but this is expensive and the same prevent nestlingly stacking of the containers when not in use.

The above is particularly true in plant nurseries wherein a relatively large number of pots must at all times be stored thus requiring as compact nesting as possible. These containers are usually fairly short although they do vary considerably in size depending on the type and size of the plant using the same.

The picking up of these pots to carry them from one place to another is a laborious, back-breaking job and rarely can more than two be picked up at once, particularly if they must be transported any substantial distance.

A few attempts have been made to provide removeable handles for containers but due to differing design detail, these attempts have been of limited success and quite often have been complete failures.

BRIEF DESCRIPTION OF INVENTION

After much research and study into the above-mentioned problems, the present invention has been developed to provide a means for picking up and carrying a plurality of containers at the same time. It is also readily connectable and disconnectable while, the heavier the containers, the stronger the gripping action.

The above is accomplished through the provision of a plurality of linkages within a housing with gripping fingers extending outwardly from end thereof and a linkage activating and carrying handle operatively extending outwardly from the opposite end. Through the interconnecting linkages, the more outward pressure that is placed on the handle means, the tighter the gripping finger means will be pressed together. This, combined with serrations on the inner surfaces of the gripping fingers form a relatively simple and yet highly efficient means for picking up and carrying a plurality of containers, particularly potting type containers.

In view of the above it is an object of the present invention to provide an improved pick-up and carrying means for container type articles.

Another object of the present invention is to provide a multiple container pick-up and means which grips the containers by their edges.

Another object of the present invention is to provide a container pick-up means having a plurality of gripping fingers which, through interconnecting linkages, allows a handle means to manipulate the same.

Another object of the present invention is to provide a pick-up means in the form of a housing having a plurality of linkages operatively mounted therein with gripping fingers outwardly extending from one end thereof and a handle operatively extending outwardly from the opposite end whereby the more pressure that is placed on the handle, the tighter the gripping action of the fingers.

Another object of the present invention is to provide an improved pick-up and carrying means for a plurality of planting pot type containers.

Another object of the present invention is to provide an improved means for picking up and carrying as many as four pot type containers at once.

Other objects and advantages of the present invention will become apparent and obvious from a study of the following description and the accompanying drawings which are merely illustrative of such invention.

DETAILED DESCRIPTION OF INVENTION

Figure 1:
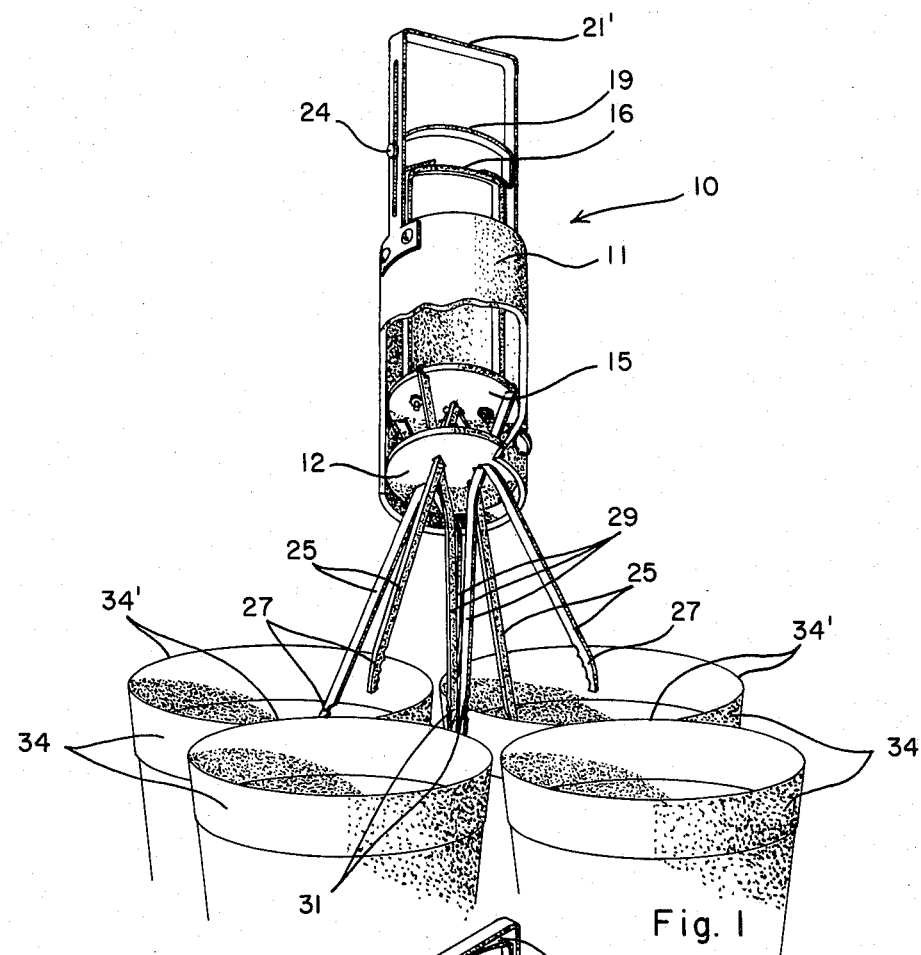
FIG. 1 is a partially cutaway bottom perspective view of the container carrying means of the present invention.
Figure 2:
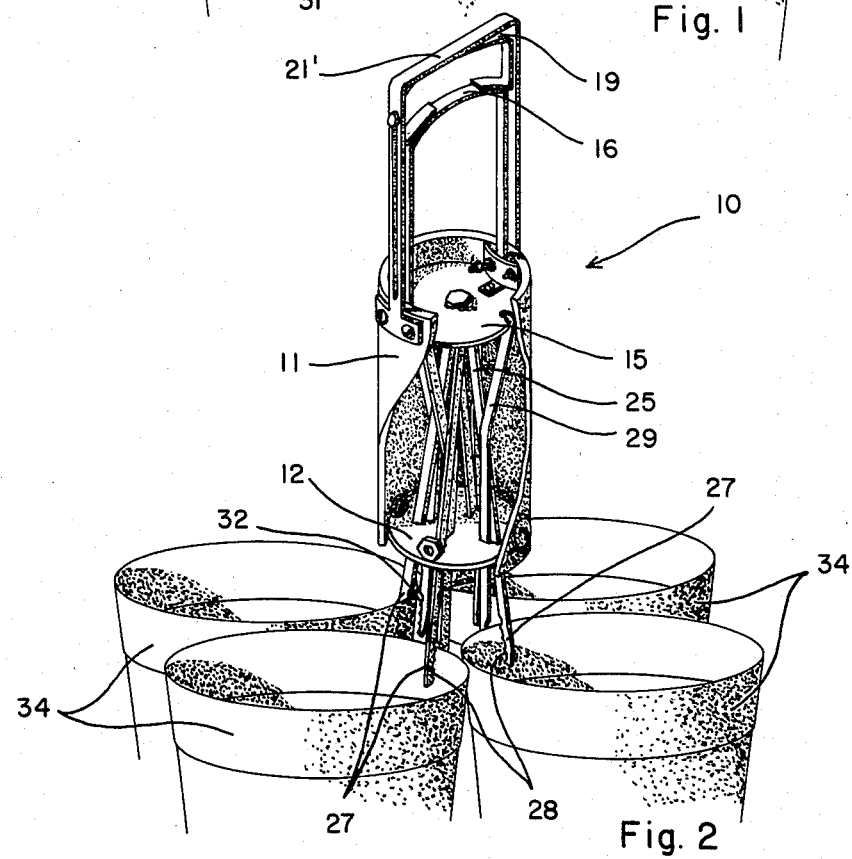
FIG. 2 is a partially cutaway top perspective view thereof.

With further reference to the drawings, the container carrying means of the present invention, indicated generally at 10, includes an elongated housing 11 with an end plate 12 fixedly secured thereto by means such as bolts 13. A plurality of slot-like openings 14 are formed in end plate 12 and are adapted to slidingly receive linkages as will hereinafter be described in greater detail.

A sliding plate 15 is mounted within housing 11 and has a generally U-shaped lifting bail 16 fixedly secured thereto by means such as rivets 17. Bail guides 18 are mounted interiorly of housing 11 and slidingly mount lifting bail 16. A lifting bail handle 19 is fixedly secured to the outer end of lifting bail 16 by means such as rivets 20.

A generally U-shaped guide handle 21 is fixedly secured to housing 11 by means such as bolts 22 which also secure guide bails 18 to such housing.

Figure 3:
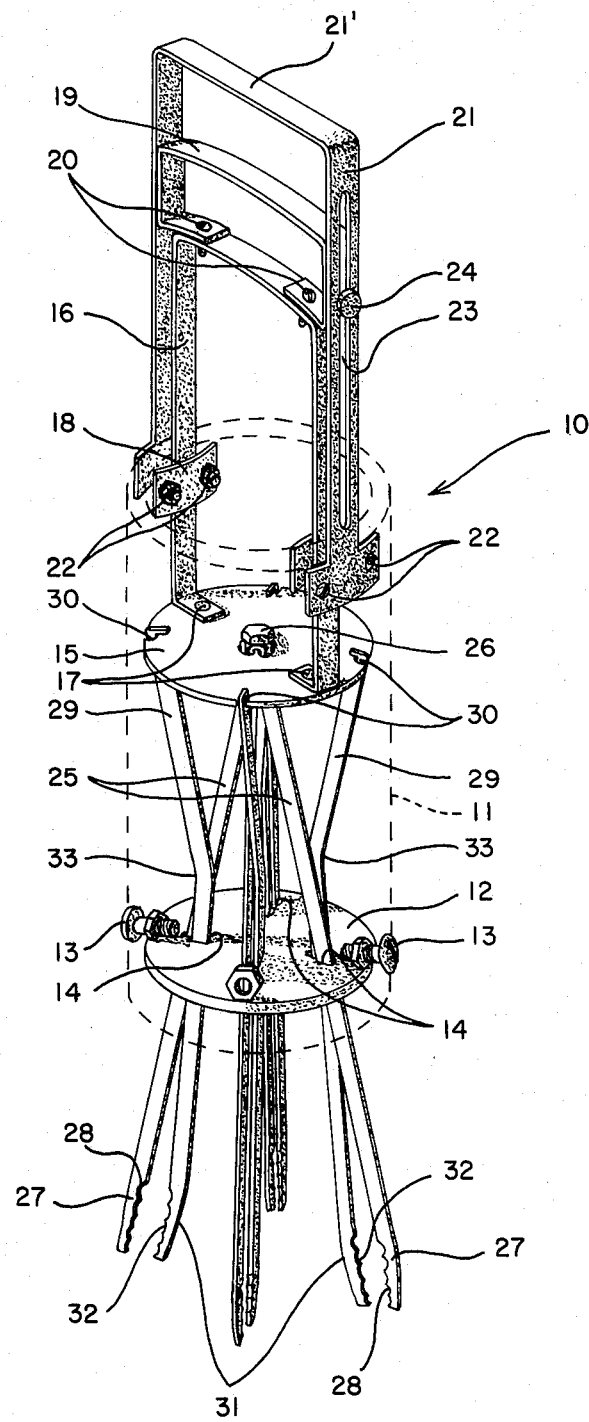
FIG. 3 is an enlarged perspective view of the operating parts of the present invention.

A slot-like opening 23 is provided in each of the leg portions of guide handle 21 and are adapted to slidingly receive guides 24 which are fixedly secured to bail handle 19 as can clearly be seen in the Figures, particularly FIG. 3.

A plurality of elongated, generally straight innerlinkages 25 are pivotively mounted to the central portion of slide plate 15 by mounting member 26. Each of these interlinkages 25 passes through one of the slot-like openings 14 and end plate 12. The outer end of each of the linkages 25 opposite its connection to mounting member 26 is a gripping finger portion 27 with an inwardly facing serrated edge 28.

A plurality of outer linkages 29 are each paired with an inner linkage 25. These outer linkages are pivotively mounted in space relationship about the periphery of sliding plate 15 as indicated at 30. Each of the outer linkages 29 passes through one of the slot-like openings 14 and its end opposite pivot 30 terminates in a gripping finger portion 31 with an outwardly disposed serrated edge 32.

Approximately one-third of the distance from pivot 30 to finger portion 31 of each of the outer linkages 29 is angulated as indicated at 33. This angulation causes the lower portion of the outer linkages to move generally longitudinally or parallel to each other through their respective slots 14 until the angulation is reached, at which point they move rapidly inwardly towards each other. On the other hand, the finger portions 27 of the straight innerlinkages 25 arced inwardly and outwardly at a constant rate when slide plate 15 is moved forward and away from end plate 12.

To use the container carrying means 10 of the present invention, a plurality of pots or similar containers 34 coinciding with the number of pairs of linkages are clustered together as shown in FIG. 1. Next, bail handle 19 is moved away from the end portion 21' of guide handle 21. This causes the fingers 27 of linkages 25 to arc outwardly as they longitudinally slide through openings 14 in end plate 12. Fingers 31 of linkages 29 at the same time move generally parallel to each other as such linkages pass through openings 14 until the points of angulation 33 reach such openings 14. Further movement of sliding plate 15 towards end plate 12 thereafter will cause fingers 31 to move rapidly inwardly towards each other until they are clustered as shown in FIG. 1. This cluster of fingers can then be placed in the central area between the pots 34 and extend over the upper edges 34' thereof. The bail handle 19 is then moved towards the outer end 21' of guide handle 21 by squeezing or similar motion. This causes the pairs of linkages, as they pass through their respective slot-like openings 14, to move the paired gripping fingers 27 and 31 towards each other to the point that the paired serrated edges 28 and 32 are in gripping engagement on the inside and outside of their respective container 34. As long as squeezing pressure is maintained between handle 19 and end 21' the gripping action on the containers will be maintained. The serrated edges of course allow a better grip to be realized.

From the above it can be seen that without having to bend down, a plurality of containers can be readily gripped and lifted for carrying.

Whenever it is desired to release the containers 34 from the carrying means 10 of the present invention, handle 19 and end portion 21' are moved away from each other thus relieving the pressure between each of the pairs of gripping fingers 27 and 31.

The gripping, carrying, and releasing procedure can be repeated as many times as necessary to accomplish the needs of the user thereof.

Although four pairs or sets of linkages with a respective gripping fingers are disclosed, it is to be understood that three, two, or even one pair could be provided. Experience has proved, however that four pairs or sets of linkages and gripping fingers are optimum since this provides a balanced load of as many containers as can usually be picked up without the weight factor becoming a consideration.

Further, using the four sets of gripping fingers disclosed, a lesser number of containers can also readily be picked up and carried.

From the above it can be seen that the present invention provides a simple to operate, relatively inexpensive container carrying means that is highly efficient in accomplishing its intended purpose of simultaneously picking up and moving a plurality of containers with a minimum of effort.

The present invention can, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A container carrying means comprising: an elongated housing structure; an end plate fixedly secured to one end of said housing structure and including a plurality of paired openings; slide means having a central area and a peripheral area means mounted within said housing structure so as to be slidable towards and away from said end plate; a plurality of paired linkages including first and second linkage means slidingly disposed in respective paired openings, each of said first linkage means being pivotally connected to the central area of said slide means, each of said second linkage means being pivotally connected to the peripheral area of said slide means, said first and second linkage means being crossed prior to entering said paired openings; and at least one of each paired linkages being angulated whereby when said slide means is moved towards said end plate, the outer ends of each pair of linkages will move away from each other and when said slide means is moved away from said end plate the outer ends of each pair of linkages will move towards each other to make gripping contact with the object to be carried.

2. The carrying means of claim 1 wherein a handle is connected to said slide means for manipulating the same.

3. The carrying means of claim 2 wherein a handle means is connected to said housing and superimposed on said handle of said slide means whereby greater pressure can be placed on the gripping ends of said linkages.

4. The carrying means of claim 1 wherein the portions of said linkages used for gripping are serrated for better holding capability.

5. The carrying means of claim 1 wherein at least two pairs of linkages are provided.

6. The carrying means of claim 1 wherein at least three pairs of linkages are provided.

7. The carrying means of claim 1 wherein at least four pairs of linkages are provided.

8. The carrying means of claim 1 wherein said containers are of the potting type.

9. The carrying means of claim 1 wherein said means is readily assemblable and disassemblable for repair and cleaning.

* * * * *